April 19, 1938.  H. F. PITCAIRN  2,114,808
SUSTAINING ROTOR FOR AIRCRAFT
Filed Feb. 19, 1937
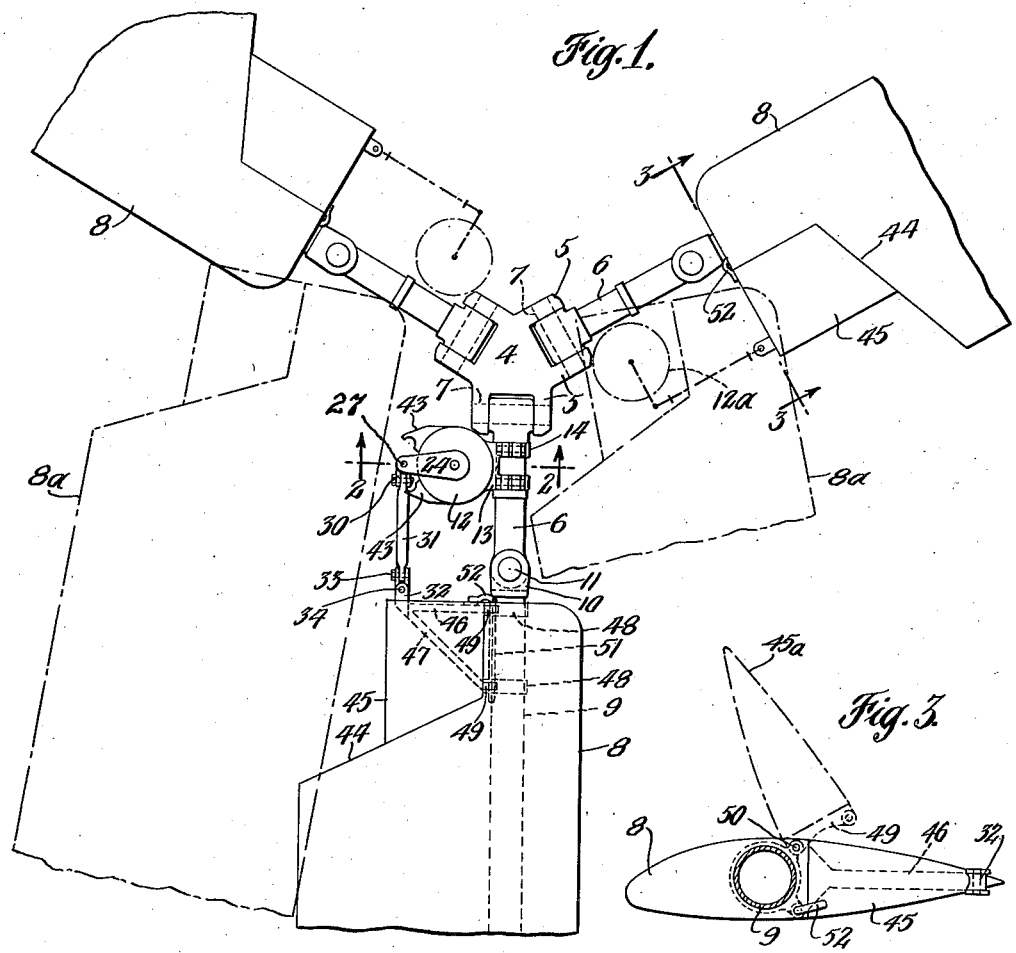
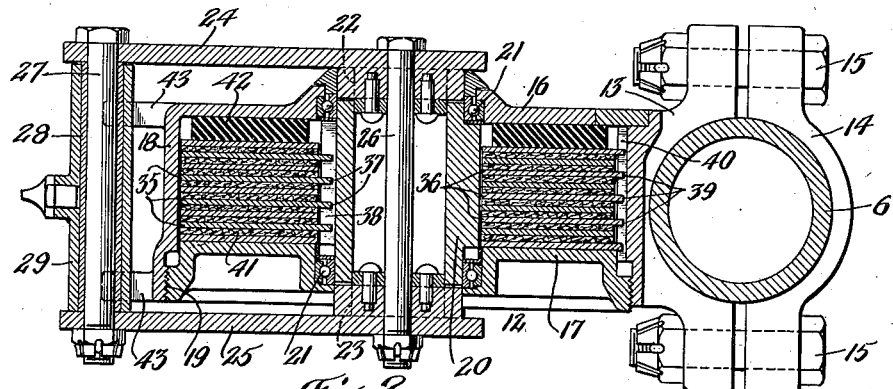
INVENTOR
Harold F. Pitcairn
BY
Synnestvedt & Lechner
ATTORNEYS Patented Apr. 19, 1938

2,114,808

UNITED STATES PATENT OFFICE 2,114,808

SUSTAINING ROTOR FOR AIRCRAFT

Harold F. Pitcairn, Bryn Athyn, Pa., assignor to Autogiro Company of America, Willow Grove, Pa., a corporation of Delaware Application February 19, 1937, Serial No. 126,545

14 Claims. (Cl. 170—164)

This invention relates to sustaining rotors for aircraft, and the invention is more particularly concerned with mounting means for the rotor blades including pivot joints, together with mechanism for controlling pivotal blade movement.

Sustaining rotors of the type in question are ordinarily provided with several blade articulations, usually including a "flapping" articulation on which the blade is free to move in a direction generally transverse its mean rotative path of travel, and a "drag" articulation permitting freedom for blade movement generally within the rotative path.

In some prior structures blade movement control devices have been employed, particularly for the movement about the drag articulation, some of these devices being of the rotationally reacting type and being arranged coaxially with the drag articulation.

The present invention is concerned with improvements in structures of the general type referred to, one of the major objects of the invention being to arrange a blade movement controlling device of the rotationally reacting type with its axis offset from the axis of the drag pivot, and with actuating connections between relatively movable parts at opposite sides of the drag pivot. By this arrangement a greater angular movement of the controlling device is provided for a given angular displacement of the blade about the drag articulation. The blade movement controlling device, or damper, is thereby made more effective.

Still further, the invention contemplates disposition of the damper or control device generally within the plane of the blade but offset from the drag articulation as aforesaid, preferably in a position close to the hub, whereby common fairing of the various parts including the damper is facilitated.

In accordance with another aspect of the invention, the damper or control device is constructed as a unit substantially independently of the drag articulation parts, this being of advantage from the standpoint of original fabrication of parts as well as inspection, repair and the like. By virtue of this separate unitary arrangement of the damper, a lighter and more compact unit may be employed, especially in relatively large rotors, since the size of the damper unit may be independent of the drag articulation parts.

The improved arrangement also provides for convenient folding of the rotor blades, this necessitating only a very few adjustments or manipulations, as will be more apparent from the following description.

How the foregoing objects and advantages, together with others which will occur to those skilled in the art are obtained, will now be set forth in connection with the following discussion of the accompanying drawing, in which—

Figure 1 is a top plan view of a sustaining rotor hub, the root end portions of three blades secured to the hub, and the improved control mechanism hereinbefore referred to;

Figure 2 is a sectional view taken substantially as indicated by the section line 2—2 of Figure 1; and Figure 3 is an inner end view of one of the blades taken as indicated by the line 3—3 of Figure 1.

The rotor hub is shown at 4, and in the embodiment illustrated this hub is provided with three pairs of apertured lugs 5—5 each pair of which co-operates with an extension link 6, the pair and link being secured together by a pivot 7 constituting a flapping articulation for the associated blade 8. At the inner end of the blade spar 9 a root end fitting or fork 10 is provided, this fitting being joined to the outer end of the extension link 6 by means of a pivot 11 constituting a drag articulation for the associated blade.

Movement of the blade about the drag articulation is controlled by the device indicated generally in Figure 1 by the reference numeral 12, this device being positioned generally in the plane of the blade at one side of the extension link 6 and being secured to the extension link by means of a bracket 13 and a cooperating part 14 clamped to the link 6 by bolts 15.

Referring to Figure 2, the control device 12 incorporates upper and lower annular members 16 and 17, respectively, secured together in spaced relation by means of the cylindrical wall 18 shown as formed integrally with the upper annulus 16, the lower member 17 having a threaded connection as shown at 19.

An axis member 20 is journalled in the central apertures of the upper and lower plates 16 and 17 by means of bearings 21. At each end of the central axis member 20 this member has a keyed connection as shown at 22 and 23 with upper and lower actuating arms 24 and 25, the central parts being secured together in their proper operative relationship by the through bolt 26.

The outer or free ends of the arms 24 and 25 are joined together by a bolt 27 carrying a sleeve 28 for maintaining proper spacing of the arms 24 and 25. Another sleeve indicated at 29 surrounds the inner one, the sleeve 29 being provided with a pair of apertured ears indicated at 30 in Figure 1, to which an operating connection 31 is pivotally joined on a generally horizontal axis. The other end of the connection 31 is attached to the fitting 32 by means of a universal joint or the like including pivotal connections 33 and 34. The fitting 32 is secured to the blade and preferably to a displaceable portion thereof referred to more fully hereinafter.

The foregoing connections, including the link 31 and arms 24 and 25, serve to rotate the central axis member 20 of the damper device upon angular movement of the blade about the drag articulation 11. This rotation of the central axis member 20 is resisted by means of friction disks disposed between the upper and lower plates 16 and 17 of the damper.

As seen in Figure 2, there are two sets of alternately interleaving friction disks 35 and 36, one set of which (35) is provided with inwardly projecting tabs 37 cooperating with longitudinal ribs 38 formed on the axis member 20 so as to cause the disks of this set to rotate with the axis member. The other set of disks (36) is provided with outwardly projecting tabs 39 fitting between and cooperating with ribs 40 provided internally of the cylindrical casing wall for the damper which is rigidly secured to the extension link, this set of disks (36) therefore being movable with the damper device as a whole and the extension link.

Friction material 41 is interposed between the several disks and at the upper side of the entire group an annulus 42 of rubber or other resilient material is preferably arranged so that upon screwing the lower plate 17 into the casing, the several disks and friction material are brought together under pressure which may be adjustable by means of the threaded connection 19.

By the foregoing means angular displacement of the actuating arms 24 and 25 with respect to the remainder of the damper casing and the extension link is resisted, and this resistance is, of course, effective (because of the connecting link 31 with the blade) to resist pivotal movement of the blade about the drag articulation 11.

Angular displacement of the blade about the drag articulation may be positively limited to a predetermined range by means of stops 43—43 carried by the housing 18 of the damper and projecting therefrom in spaced relation (see Figure 1) at each side of the upright bolt 27 and the sleeves surrounding it.

If desired, when the blades are to be folded, any one of the pivot joints in the operating connection between the arms 24 and 25 and the blade to be folded may be disconnected so as to permit swinging of the blade through a large arc about the drag articulation 11. Folding of this general type is shown in Figure 1, in which view it is assumed that the blade at the bottom is extended rearwardly of the machine over the tail. The inner end portions of the other two blades are shown in dot-and-dash lines at 8a in the folded positions, i. e., in positions approximating parallelism with the blade first mentioned so that all three would extend rearwardly substantially over the tail of the machine.

It will be noted that a root end portion of the blade at the right of Figure 1, when folded to the position indicated at 8a, overlies the damper for that blade, diagrammatically shown at 12a. Since the damper is preferably mounted substantially in the plane of the blade, this would obviously cause interference if an attempt were made to fold that blade, and with this in mind I prefer to cut away the main blade structure to the line 44 in this region and then displaceably mount a small blade part 45 which, in large part serves as a fairing for the structural members 46 and 47 on which the fitting 32 is carried.

The displaceable mounting arrangements for the blade section or fairing member 45 include brackets 48 mounted in spaced relation on the spar 9 and cooperating fittings 49 at the inner ends of elements 46 and 47. Toward the upper side of the blade, the members 49 are connected to the spar fittings 48 by means of a pivot as shown at 50 in Figure 3, about which pivot the fairing member 45 may swing upwardly as shown by the dot-and-dash outline 45a in Figure 3. Toward the lower side of the blade, the members 49 and the spar fittings may be secured together by means of a displaceable pin 51 having a readily accessible handle 52 by means of which the pin may be withdrawn.

In folding a three-bladed rotor in the manner shown in Figure 1, one blade would be positioned to overlie the tail of the machine, and the pin 51 for the blade at the right will be withdrawn by means of the handle 52. One joint of the damper operating connection may be disconnected and after upward displacement of the movable root end portion of the blade, this blade may be swung back to the position indicated. The blade at the left may be swung rearwardly after disconnection of one of the pivot joints in the actuating linkage for the damper of that blade.

The foregoing provides a very convenient and simple mode of blade folding.

From the description of the damper parts and the position and mounting thereof, it will further be seen that the arrangement is such as to provide a damper unit the parts of which, as to structure, size and operation, are independent of the drag articulation.

Locating the damper with its axis offset from the axis of the drag pivot facilitates the employment of connections for actuating the damper, which connections are so arranged as to result in an increased angular displacement of the damper for a given angular displacement of the blade.

Finally, positioning of the damper as herein disclose in the plane of the blade provides for convenient fairing even of the entire damper and assembly including its control connections together with the extension link, blade pivots and parts of the hub.

I claim:—

1. In a bladed aircraft sustaining rotor, a hub, means for securing a blade to the hub including a flapping pivot and a drag pivot interconnected by an extension link, a rotative damper device for controlling pivotal movement of the blade about one of said pivots, said device lying substantially in the plane of the blade and offset to one side of the extension link, and operating connections between said device and the extension link on the one hand and, on the other hand, between said device and a part with respect to which the extension link has relative pivotal movement.

2. In an aircraft sustaining rotor, a hub, a blade, a pivot joint securing the blade to the hub and having its axis extended at an angle to the longitudinal axis of the blade, and a rotative damper device for controlling pivotal movement of the blade about said axis, said device being positioned at the root end of the blade substantially in the plane thereof with its rotative axis parallel to but offset from the blade pivot axis.

3. In an aircraft sustaining rotor, a hub, a blade, mechanism for connecting the blade to the hub including a drag articulation, and means for controlling movement of the blade about said drag articulation including a rotative damper device carried by the blade mounting inboard of said articulation substantially in the plane of the blade, a pivotally mounted actuating arm for said device, and an operating connection extended from said arm outwardly and coupled with the blade outboard of said articulation.

4. In an aircraft sustaining rotor, a hub, a blade, mechanism for connecting the blade to the hub including a drag articulation, and means for controlling movement of the blade about said drag articulation including a rotative damper device carried by the blade mounting inboard of said articulation substantially in the plane of the blade, a pivotally mounted actuating arm for said device, and an operating connection extended from said arm outwardly and coupled with the blade outboard of said articulation, the blade being pivotally movable on said articulation to an extreme angular position for folding purposes, and said operating connection being disconnectible to provide freedom for folding movement of the blade.

5. In an aircraft sustaining rotor having a hub and a blade pivotally connected therewith, a damper device for controlling pivotal blade movements, said device being offset from the pivotal connection for the blade and lying substantially in the plane of the blade, the blade being pivotally movable on said connection to an extreme angular position for folding purposes, and a root end portion of the blade being displaceable out of the plane thereof to clear the damper device when the blade is folded.

6. In an aircraft sustaining rotor having a hub and a blade pivotally connected therewith, a damper device for controlling pivotal blade movements, said device being offset from the pivotal connection for the blade and lying substantially in the plane of the blade, the blade being pivotally movable on said connection to an extreme angular position for folding purposes, a root end portion of the blade being displaceable out of the plane thereof to clear the damper device when the blade is folded, and an operating connection for the damper device interconnecting the said device and the displaceable portion of the blade.

7. In an aircraft sustaining rotor having a hub and a blade pivotally connected therewith, a damper device for controlling pivotal blade movements, said device being offset from the pivotal connection for the blade and lying substantially in the plane of the blade, the blade being pivotally movable on said connection to an extreme angular position for folding purposes, a root end portion of the blade being displaceable out of the plane thereof to clear the damper device when the blade is folded, an operating connection for the damper device interconnecting the said device and the displaceable portion of the blade, and releasable means for retaining the displaceable portion of the blade in normal flight position.

8. In an aircraft sustaining rotor having a hub and a blade pivotally connected therewith, a damper device for controlling pivotal blade movements, said device being offset from the pivotal connection for the blade and lying substantially in the plane of the blade, the blade being pivotally movable on said connection to an extreme angular position for folding purposes, a root end portion of the blade being displaceable out of the plane thereof to clear the damper device when the blade is folded, and releasable means for retaining the displaceable portion of the blade in normal flight position.

9. In a bladed aircraft sustaining rotor, a hub, means for securing a blade to the hub including a flapping pivot and a drag pivot interconnected by an extension link, and a rotative damper device for controlling pivotal movement of the blade about one of said pivots, said device lying substantially in the plane of the blade and offset to one side of the extension link.

10. In an aircraft sustaining rotor having a hub and blades, mounting means for securing a blade to the hub including a plurality of pivot joints interconnected by an extension link, a rotative damper device for controlling movement of the blade about one of said joints, the damper device being secured to the extension link and having a pivotal actuating element projecting therefrom generally transversely of the extension link, and an operating connection interconnecting the actuating element and the blade and extended generally parallel to the extension link.

11. In an aircraft sustaining rotor, a hub, a blade pivotally connected to the hub on an axis extended at an angle to the longitudinal axis of the blade, a rotationally reacting damper device for controlling pivotal blade movement, said device having its axis offset from but parallel to the first axis, and operating connections for the device connected with parts which have relative pivotal movement during pivoting of the blade, the operating connections providing angular movement of the damper device greater than the angular movement of the blade.

12. In an aircraft, a sustaining rotor including a hub and a blade connected with the hub with freedom for swinging movement generally in the plane of the rotor throughout a relatively small angular range under the influence of flight forces, the blade further being swingable to an extreme angular position well beyond the normal flight range for folding purposes, and a device for controlling swinging movement of the blade during flight, said device being located generally in the plane of the blade and in the path of movement of a portion of the blade when being swung for folding, said blade portion being displaceable away from the plane of the blade to avoid interference thereof with said device when the blade is folded.

13. In an aircraft sustaining rotor, a hub, a blade pivoted thereto, a rotationally reacting damper device for controlling movement of the blade about its pivot, and actuating means connecting the damper device with parts which are relatively pivotally movable about the blade pivot and providing angular displacement of the damper greater than the accompanying blade displacement.

14. In an aircraft sustaining rotor, a hub, a blade pivoted thereto, a rotationally reacting damper device for controlling movement of the blade about its pivot, said device being offset to one side of the longitudinal axis of the blade, and actuating means connecting the damper device with parts which are relatively pivotally movable about the blade pivot and providing angular displacement of the damper greater than the accompanying blade displacement.

HAROLD F. PITCAIRN.